United States Patent
Lee et al.

(10) Patent No.: US 10,768,461 B2
(45) Date of Patent: Sep. 8, 2020

(54) LIGHT MODULATION DEVICE

(71) Applicant: LG Chem, Ltd., Seoul (KR)

(72) Inventors: Hyun Jun Lee, Daejeon (KR); Eun Jung Lim, Daejeon (KR); Jung Sun You, Daejeon (KR); Min Jun Gim, Daejeon (KR); Dong Hyun Oh, Daejeon (KR); Jin Hong Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/480,497

(22) PCT Filed: Apr. 30, 2018

(86) PCT No.: PCT/KR2018/005018
§ 371 (c)(1),
(2) Date: Jul. 24, 2019

(87) PCT Pub. No.: WO2018/199718
PCT Pub. Date: Nov. 1, 2018

(65) Prior Publication Data
US 2019/0384094 A1    Dec. 19, 2019

(30) Foreign Application Priority Data

Apr. 28, 2017 (KR) .................. 10-2017-0054964
Jan. 11, 2018 (KR) .................. 10-2018-0003783
(Continued)

(51) Int. Cl.
*G02F 1/1333* (2006.01)
*G02B 27/01* (2006.01)
(Continued)

(52) U.S. Cl.
CPC ... *G02F 1/133365* (2013.01); *G02B 27/0172* (2013.01); *G02B 27/0176* (2013.01);
(Continued)

(58) Field of Classification Search
CPC .... G02B 2027/0178; G02B 2027/0132; G02B 27/0172; G02B 27/0176; G02B 27/01;
(Continued)

(56) References Cited

U.S. PATENT DOCUMENTS 4,505,546 A    3/1985 Umeda et al.
4,586,790 A    5/1986 Umeda et al.
(Continued)

FOREIGN PATENT DOCUMENTS

EP    0022311 A1    1/1981
EP    2848979 A2    3/2015
(Continued)

OTHER PUBLICATIONS

Extended European Search Report including Written Opinion for Application No. EP18791578 dated Jan. 28, 2020. 10 pages.
(Continued)

*Primary Examiner* — Thoi V Duong
(74) *Attorney, Agent, or Firm* — Lerner, David, Littenberg, Krumholz & Mentlik, LLP

(57) ABSTRACT

The present application relates to a light modulation device and a use thereof. The present application can provide a light modulation device having both excellent mechanical properties and optical properties by applying a polymer film that is also optically anisotropic and mechanically anisotropic to a substrate.

12 Claims, 1 Drawing Sheet

(30) Foreign Application Priority Data

| Jan. 11, 2018 | (KR) | 10-2018-0003784 |
| Jan. 11, 2018 | (KR) | 10-2018-0003785 |
| Jan. 11, 2018 | (KR) | 10-2018-0003786 |
| Jan. 11, 2018 | (KR) | 10-2018-0003787 |
| Jan. 11, 2018 | (KR) | 10-2018-0003788 |
| Jan. 11, 2018 | (KR) | 10-2018-0003789 |
| Jan. 12, 2018 | (KR) | 10-2018-0004305 |

(51) Int. Cl.
*G02F 1/13* (2006.01)
*G02F 1/13363* (2006.01)
*G02F 1/137* (2006.01)

(52) U.S. Cl.
CPC ........ *G02F 1/1326* (2013.01); *G02F 1/13363* (2013.01); *G02F 1/13725* (2013.01); *G02F 1/133305* (2013.01); *G02B 2027/0178* (2013.01)

(58) Field of Classification Search
CPC ............. G02F 1/0102; G02F 1/133788; G02F 1/133536; G02F 1/13363; G02F 1/133711; G02F 1/13725; G02F 1/1334; G02F 1/133365; G02F 1/133553; G02F 1/133305; G02F 1/1326; G02F 1/1347; G02F 1/1396; G02F 1/1337; G02F 1/13737; G02F 1/1391; G02F 2001/133738; G02F 2001/133742; G02F 2001/13756; G02F 2202/04; B32B 27/06; B32B 7/00; B32B 2250/24; B32B 2305/55; B32B 2307/4026; G02C 2202/16; G02C 7/101
See application file for complete search history.

(56) References Cited

U.S. PATENT DOCUMENTS

| 5,608,567 | A  | 3/1997  | Grupp |
| 5,798,809 | A  | 8/1998  | Nakamura et al. |
| 2002/0093620 | A1 | 7/2002 | Itou et al. |
| 2005/0068480 | A1 | 3/2005 | Hiyama et al. |
| 2007/0182885 | A1 | 8/2007 | Egi et al. |
| 2007/0213861 | A1 | 9/2007 | Takeichi |
| 2008/0266500 | A1 | 10/2008 | Nimura |
| 2010/0182544 | A1 | 7/2010 | Ikeda et al. |
| 2013/0093982 | A1 | 4/2013 | Kuroda et al. |
| 2013/0107176 | A1 | 5/2013 | Van Oosten |
| 2014/0232983 | A1 | 8/2014 | Tokumaru et al. |
| 2015/0002010 | A1 | 1/2015 | Lee et al. |
| 2015/0378189 | A1 | 12/2015 | Kim et al. |
| 2016/0017226 | A1 | 1/2016 | Fujisawa et al. |
| 2016/0154159 | A1 | 6/2016 | Kim et al. |
| 2017/0108632 | A1 | 4/2017 | Yu et al. |
| 2017/0190972 | A1 | 7/2017 | Kuriyama et al. |
| 2018/0284536 | A1 | 10/2018 | Lee et al. |

FOREIGN PATENT DOCUMENTS

| EP | 2857870 A1 | 4/2015 |
| JP | S60254023 A | 12/1985 |
| JP | H0519249 A | 1/1993 |
| JP | H0695065 A | 4/1994 |
| JP | H6273746 A | 9/1994 |
| JP | H10239668 A | 9/1998 |
| JP | 2004354750 | 12/2004 |
| JP | 3658122 B2 | 6/2005 |
| JP | 2007163852 A | 6/2007 |
| JP | 2008242041 A | 10/2008 |
| JP | 2010002664 A | 1/2010 |
| JP | 201397279 A | 5/2013 |
| JP | 2017167267 A | 9/2017 |
| KR | 19980018011 A | 6/1998 |
| KR | 20020061150 A | 7/2002 |
| KR | 20050031940 A | 4/2005 |
| KR | 20050090711 A | 9/2005 |
| KR | 20070089635 A | 8/2007 |
| KR | 20080022525 A | 3/2008 |
| KR | 20080073252 A | 8/2008 |
| KR | 20080079564 A | 9/2008 |
| KR | 20080092466 A | 10/2008 |
| KR | 20110101854 A | 9/2011 |
| KR | 20120072177 A | 7/2012 |
| KR | 20120089200 A | 8/2012 |
| KR | 20130067877 A | 6/2013 |
| KR | 101408387 B1 | 6/2014 |
| KR | 20140072032 A | 6/2014 |
| KR | 101426577 B1 | 8/2014 |
| KR | 20150002354 A | 1/2015 |
| KR | 20150138680 A | 12/2015 |
| KR | 20160002350 A | 1/2016 |
| KR | 20160016428 A | 2/2016 |
| KR | 20160065552 A | 6/2016 |
| KR | 20160088741 A | 7/2016 |
| KR | 20160107706 A | 9/2016 |
| KR | 20160115428 A | 10/2016 |
| KR | 20170003266 A | 1/2017 |
| KR | 20170047972 A | 5/2017 |
| KR | 20170081740 A | 7/2017 |
| KR | 20170082252 A | 7/2017 |
| KR | 20170090236 A | 8/2017 |
| KR | 20170101157 A | 9/2017 |
| KR | 20170101158 A | 9/2017 |
| TW | I559059 B | 11/2016 |
| WO | 2017041167 A1 | 3/2017 |

OTHER PUBLICATIONS

International Search Report from Application No. PCT/KR2018/005016 dated Aug. 10, 2018, 2 pages.
International Search Report from Application No. PCT/KR2018/005018 dated Aug. 14, 2018, 2 pages.
International Search Report from Application No. PCT/KR2018/005021 dated Aug. 16, 2018, 2 pages.
Gim et al., "Light Modulation Device", U.S. Appl. No. 16/607,520, filed Oct. 23, 2019.
Gim et al., "Light Modulation Device," U.S. Appl. No. 16/607,623, filed Oct. 23, 2019.
Gim et al., "Light Modulation Device," U.S. Appl. No. 16/607,904, filed Oct. 24, 2019.
Gim et al., "Light Modulation Device," U.S. Appl. No. 16/608,007, filed Oct. 24, 2019.
Lim et al., "Light Modulation Device," U.S. Appl. No. 16/500,248, filed Oct. 2, 2019.
Search report from International Application No. PCT/KR2018/005017, dated Aug. 7, 2018.
Search Report from International Application No. PCT/KR2018/005020, dated Aug. 30, 2018.
Search report from International Application No. PCT/KR2018/005023, dated Aug. 16, 2018.
Search report from Notice of Allowance from Taiwan Application No. 107114707 completed Mar. 28, 2019.
Extended European Search Report including the Written Opinion for Application No. EP 18790144.2 dated Jan. 24, 2020, 9 pages.

[Figure 1]
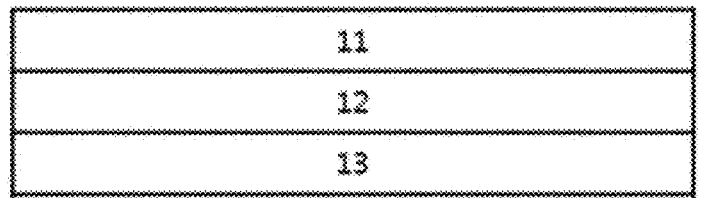
[Figure 2]
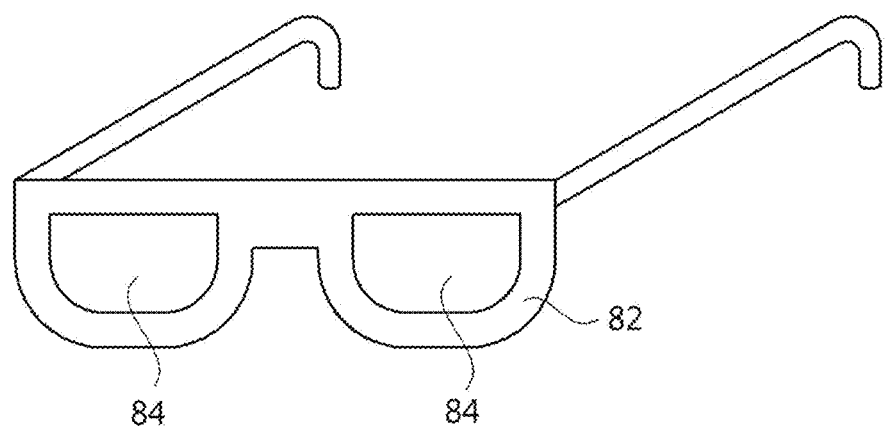
[Figure 3]
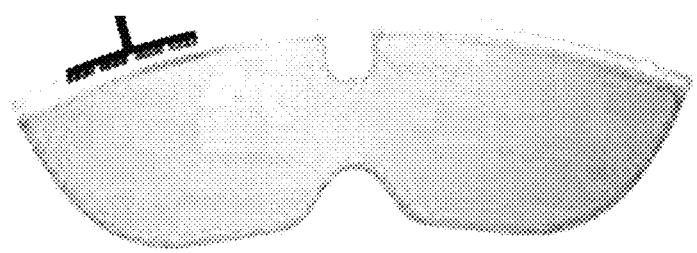
[Figure 4]
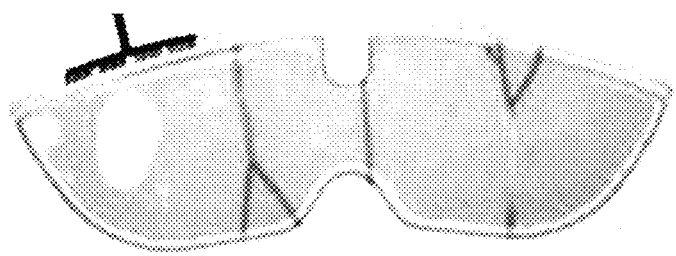

LIGHT MODULATION DEVICE

CROSS-REFERENCE TO RELATED APPLICATIONS

This application is a national phase entry under 35 U.S.C. § 371 of International Application No. PCT/KR2018/005018, filed Apr. 30, 2018, which claims priority to Korean Patent Application No. 10-2017-0054964, filed Apr. 28, 2017, Korean Patent Application No. 10-2018-0003783, Korean Patent Application No. 10-2018-0003784, Korean Patent Application No. 10-2018-0003785, Korean Patent Application No. 10-2018-0003786, Korean Patent Application No. 10-2018-0003787, Korean Patent Application No. 10-2018-0003788 and Korean Patent Application No. 10-2018-0003789, all filed Jan. 11, 2018, and Korean Patent Application No. 10-2018-0004305, filed Jan. 12, 2018, the disclosures which are incorporated herein by reference in their entirety.

TECHNICAL FIELD

This application relates to a light modulation device.

BACKGROUND ART

A light modulation device, in which a light modulation layer including a liquid crystal compound or the like is positioned between two substrates facing each other, has been used for various applications.

For example, in Patent Document 1 (EP Patent Application Publication No. 0022311) a variable transmittance device using a so-called GH cell (guest host cell), in which a mixture of a liquid crystal host material and a dichroic dye guest is applied, as a light modulation layer has been known.

In such a device, a glass substrate having excellent optical isotropy and good dimensional stability has mainly been used as the substrate.

There is an attempt to apply a polymer film substrate instead of a glass substrate as a substrate of the light modulation device, while the application of the light modulation device is extended to eyewear or a smart window such as a sunroof without being limited to the display device and the shape of the device is not limited to a plane, but various designs such as a folding form are applied thereto, with showing the necessity of a so-called flexible device or the like.

In the case of applying the polymer film substrate, it is known that it is advantageous to apply a film substrate which is as optically isotropic as possible and has a small difference in physical properties in so-called MD (machine direction) and TD (transverse direction) directions in order to secure characteristics similar to those of a glass substrate.

DISCLOSURE

Technical Problem

The present application relates to a light modulation device. It is an object of the present application to provide a light modulation device which is excellent in both mechanical properties and optical properties by applying an optically and mechanically anisotropic polymer film as a substrate.

Technical Solution

In this specification, the term such as vertical, horizontal, orthogonal or parallel among terms defining an angle means substantially vertical, horizontal, orthogonal or parallel in the range without impairing intended effects, and the range of vertical, horizontal, orthogonal or parallel includes an error such as a production error or a deviation (variation). For example, each case of the foregoing may include an error within about ±15 degrees, an error within about ±10 degrees or an error within about ±5 degrees.

Among physical properties mentioned herein, when the measured temperature affects relevant physical properties, the physical properties are physical properties measured at room temperature, unless otherwise specified.

In this specification, the term room temperature is a temperature in a state without particularly warming or cooling, which may mean one temperature in a range of about 10° C. to 30° C., for example, a temperature of about 15° C. or higher, 18° C. or higher, 20° C. or higher, or about 23° C. or higher, and about 27° C. or lower. Unless otherwise specified, the unit of the temperature mentioned herein is ° C.

The phase difference and the refractive index mentioned herein mean a refractive index for light having a wavelength of about 550 nm, unless otherwise specified.

Unless otherwise specified, the angle formed by any two directions, which is mentioned herein, may be an acute angle of acute angles to obtuse angles formed by the two directions, or may be a small angle from angles measured in clockwise and counterclockwise directions. Thus, unless otherwise specified, the angles mentioned herein are positive. However, in order to display the measurement direction between the angles measured in the clockwise direction or the counterclockwise direction if necessary, any one of the angle measured in the clockwise direction and the angle measured in the counterclockwise direction may be represented as a positive number, and the other angle may be represented as a negative number.

The liquid crystal compound included in the active liquid crystal layer or the light modulation layer herein may also be referred to as liquid crystal molecules, a liquid crystal host (when included with the dichroic dye guest), or simply liquid crystals.

The present application relates to a light modulation device. The term light modulation device may mean a device capable of switching between at least two or more different light states. Here, the different light states may mean states in which at least the transmittance and/or the reflectance are different.

An example of the state that the light modulation device can implement includes a transmission mode state, a blocking mode state, a high reflection mode state and/or a low reflection mode state.

In one example, the light modulation device, at least, may be a device capable of switching between the transmission mode state and the blocking mode state, or may be a device capable of switching between the high reflection mode and the low reflection mode.

The transmittance of the light modulation device in the transmission mode may be at least 20% or more, 25% or more, 30% or more, 35% or more, 40% or more, 45% or more, 50% or more, 55% or more, 60% or more, 65% or more, 70% or more, 75% or more, or 80% or more or so. Also, the transmittance of the light modulation device in the blocking mode may be 60% or less, 55% or less, 50% or less, 45% or less, 40% or less, 35% or less, 30% or less, 25% or less, 20% or less, 15% or less, 10% or less, or 5% or less. Since the higher the transmittance in the transmission mode state is, the more advantageous it is and the lower the transmittance in the blocking mode state is, the more advantageous it is, the upper limit of the transmittance in the transmission mode state and the lower limit of the transmittance in the blocking mode state are not particularly limited, where in one example, the upper limit of the transmittance in the transmission mode state may be about 100% and the lower limit of the transmittance in the blocking mode state may be about 0%.

On the other hand, in one example, in the light modulation device capable of switching between the transmission mode state and the blocking mode state, the difference between the transmittance in the transmission mode state and the transmittance in the blocking mode state (transmission mode–blocking mode) may be 15% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

The above-mentioned transmittance may be, for example, linear light transmittance. The linear light transmittance is a percentage of the ratio of the light transmitted in the same direction as the incident direction to the light incident on the device. For example, if the device is in the form of a film or sheet, the percentage of the light transmitted through the device in the direction parallel to the normal direction among the light incident in a direction parallel to the normal direction of the film or sheet surface may be defined as the transmittance.

The reflectance of the light modulation device in the high reflection mode state may be at least 10% or more, 15% or more, 20% or more, 25% or more, 30% or more, 35% or more, or 40% or more. Also, the reflectance of the light modulation device in the low reflection mode state may be 20% or less, 15% or less, 10% or less, or 5% or less. Since the higher the reflectance in the high reflectance mode is, the more advantageous it is and the lower the reflectance in the low reflectance mode is, the more advantageous it is, the upper limit of the reflectance in the high reflection mode state and the lower limit of the reflectance in the low reflection mode state are not particularly limited, where in one example, the reflectance in the high reflection mode state may be about 60% or less, 55% or less, or 50% or less, and the lower limit of the reflectance in the low reflection mode state may be about 0%.

Besides, in one example, in the light modulation device capable of switching between the low reflection mode state and the high reflection mode state, the difference between the reflectance in the high reflection mode state and the reflectance in the low reflection mode state (high reflection mode–low reflection mode) may be 5% or more, 10% or more, 15% or more, 20% or more, 25% or more, 30% or more, 35% or more, or 40% or more, or may be 90% or less, 85% or less, 80% or less, 75% or less, 70% or less, 65% or less, 60% or less, 55% or less, 50% or less, or 45% or less.

The above-mentioned transmittance and reflectance may be each transmittance or reflectance for any one wavelength in the visible light region, for example, any one wavelength in a range of about 400 to 700 nm or about 380 to 780 nm, or transmittance or reflectance for the entire visible light region, maximum or minimum transmittance or reflectance among the transmittance or reflectance for the entire visible light region, or an average value of the transmittance or an average value of the reflectance in the visible region.

The light modulation device of the present application may be designed to switch between at least two or more states of any one state selected from the transmission mode, the blocking mode, the high reflection mode and the low reflection mode, and another state. If necessary, other states other than the above states, for example, other third states or further states including an intermediate transmittance state in the transmission mode and blocking mode states, an intermediate reflectance state in the high reflection mode and low reflection mode states, or the like can also be implemented.

The switching of the light modulation device may be controlled depending on whether or not an external signal, for example, a voltage signal is applied. For example, in a state of not applying an external signal such as a voltage, the light modulation device may maintain any one of the above-described states, and then may be switched to another state when a voltage is applied. The state of the mode may be changed or the third different mode state may also be implemented, by changing the intensity, frequency and/or shape of the applied voltage.

The light modulation device of the present application may basically comprise a light modulation film layer having two substrates disposed opposite to each other and a light modulation layer positioned between the substrates. Hereinafter, for convenience, any one of the two substrates disposed opposite to each other will be referred to as a first substrate, and the other substrate will be referred to as a second substrate.

FIG. 1 is a cross-sectional diagram of a light modulation film layer of an exemplary light modulation device of the present application, where the light modulation film layer may comprise first and second polymer film substrates (11, 13), and a light modulation layer (12) present between the first and second polymer film substrates.

In the light modulation device of the present application, a polymer film substrate is applied as the substrate. The substrate of the light modulation device may not comprise a glass layer. The present application can constitute a device having no optical defect such as a so-called rainbow phenomenon but excellent mechanical properties, by disposing polymer film substrates having optically large anisotropy and also anisotropy even in terms of mechanical properties in a specific relationship. Such a result is contrary to the common sense of the prior art that optically isotropic substrates must be applied in order to secure excellent optical properties and substrates having isotropic mechanical properties are advantageous in terms of mechanical properties such as dimensional stability of the device.

In this specification, the polymer film substrate having anisotropy in terms of optical and mechanical properties may be referred to as an asymmetric substrate or an asymmetric polymer film substrate. Here, the fact that the polymer film substrate is optically anisotropic is the case of having the above-described in-plane retardation, and the fact that it is anisotropic in terms of mechanical properties is the case of having physical properties to be described below.

Hereinafter, physical properties of the polymer film substrate mentioned herein may be physical properties of the polymer film substrate itself, or physical properties in a state where an electrode layer is formed on one side of the polymer film substrate. In this case, the electrode layer may be an electrode layer formed in a state where the polymer film substrate is included in the optical device.

Measurement of physical properties of each polymer film substrate mentioned herein is performed according to the method described in the example section of this specification.

In one example, the in-plane retardation of the first and second polymer film substrates may be about 4,000 nm or more, respectively.

In this specification, the in-plane retardation (Rin) may mean a value calculated by Equation 1 below.

$$Rin = d \times (nx - ny) \quad \text{[Equation 1]}$$

In Equation 1, Rin is in-plane retardation, d is a thickness of the polymer film substrate, nx is a refractive index in the in-plane slow axis direction of the polymer film substrate, ny is a refractive index in the fast axis direction, which is the refractive index of the in-plane direction perpendicular to the slow axis direction.

The in-plane retardation of each of the first and second polymer film substrates may be 4,000 nm or more, 5,000 nm or more, 6,000 nm or more, 7,000 nm or more, 8,000 nm or more, 9,000 m or more, 10,000 m or more, 11,000 m or more, 12,000 m or more, 13,000 m or more, 14,000 m or more, or 15,000 m or more or so. The in-plane retardation of each of the first and second polymer film substrates may be about 50,000 nm or less, about 40,000 nm or less, about 30,000 nm or less, 20,000 nm or less, 18,000 nm or less, 16,000 nm or less, 15,000 nm or less, or 12,000 nm or less or so.

As a polymer film having large retardation as above, a film known as a so-called high-stretched PET (poly(ethylene terephthalate)) film or SRF (super retardation film), and the like is typically known. Therefore, in the present application, the polymer film substrate may be, for example, a polyester film substrate.

The film having extremely high retardation as above is known in the art, and such a film exhibits high asymmetry even in mechanical properties by high stretching or the like during preparation procedures as well as optically large anisotropy. A representative example of the polymer film substrate in a state known in the art is a polyester film such as a PET (poly(ethylene terephthalate)) film, and for example, there are films of the trade name SRF (super retardation film) series supplied by Toyobo Co., Ltd.

Unless otherwise specified, each of the polymer film substrates may have a thickness direction retardation value of about 1,000 nm or less as calculated by Equation 2 below.

$$Rth = d \times (nz - ny) \quad \text{[Equation 2]}$$

In Equation 2, Rth is thickness direction retardation, d is a thickness of the polymer film substrate, and ny and nz are refractive indexes in the y axis and z axis directions of the polymer film substrate, respectively. The y axis of the polymer film substrate is the in-plane fast axis direction, and the z axis direction means the thickness direction of the polymer film substrate.

The polymer film substrate may also have gas permeability of less than 0.002 GPU at room temperature. The gas permeability of the polymer film substrate may be, for example, 0.001 GPU or less, 0.0008 GPU or less, 0.006 GPU or less, 0.004 GPU or less, 0.002 GPU or less, or 0.001 GPU or less. When the gas permeability of the polymer film substrate is within the above range, it is possible to provide a light modulation device having excellent durability in which void generation by an external gas is suppressed. The lower limit of the range of the gas permeability is not particularly limited. That is, the gas permeability is more advantageous, as the value is smaller.

In one example, in each of the polymer film substrates, a ratio (E1/E2) of an elongation (E1) in any first direction in the plane to an elongation (E2) in a second direction perpendicular to the first direction may be 3 or more. In another example, the ratio (E1/E2) may be about 3.5 or more, 4 or more, 4.5 or more, 5 or more, 5.5 or more, 6 or more, or 6.5 or more. In another example, the ratio (E1/E2) may be about 20 or less, 18 or less, 16 or less, 14 or less, 12 or less, 10 or less, 8 or less, or 7.5 or less.

As used herein, the terms "first direction," "second direction" and "third direction" of the polymer film substrate are each any in-plane direction of the film substrate. For example, when the polymer film substrate is a stretched polymer film substrate, the in-plane direction may be an in-plane direction formed by MD (machine direction) and TD (transverse direction) directions of the polymer film substrate. In one example, the first direction described herein may be any one of the slow axis direction and the fast axis direction of the polymer film substrate, and the second direction may be the other of the slow axis direction and the fast axis direction. In another example, when the polymer film substrate is a stretched polymer film substrate, the first direction may be any one of MD (machine direction) and TD (transverse direction) directions, and the second direction may be the other of MD (machine direction) and TD (transverse direction) directions.

In one example, the first direction of the polymer film substrate mentioned herein may be the TD direction or the slow axis direction.

Here, each of the first and second polymer film substrates may have the elongation in the first direction (for example, the above-described slow axis direction or TD direction) of 15% or more, or 20% or more. In another example, the elongation may be about 25% or more, 30% or more, 35% or more, or 40% or more, or may be about 100% or less, 90% or less, 80% or less, 70% or less, about 60% or less, 55% or less, 50% or less, or 45% or less.

In one example, in each of the first and second polymer film substrates, an elongation (E3) in a third angle forming an angle within a range of 40 degrees to 50 degrees or about 45 degrees with the first and second directions, respectively, is larger than the elongation (E1) in the first direction (for example, the above-described slow axial direction or TD direction), where the ratio (E3/E2) of the elongation (E3) in the third direction to the elongation (E2) in the second direction may be 5 or more.

In another example, the ratio (E3/E2) may be 5.5 or more, 6 or more, 6.5 or more, 7 or more, 7.5 or more, 8 or more, or 8.5 or more, and may be about 20 or less, 18 or less, 16 or less, 14 or less, 12 or less, or 10 or less.

Here, the angle formed by the third direction and the first or second direction is an acute angle of the angles formed by the first direction and the third direction, and is an acute angle of the angles formed by the second direction and the third direction.

Here, each of the first and second polymer film substrates may have the elongation in the third direction of 30% or more. In another example, the elongation may be about 35% or more, 40% or more, 45% or more, 50% or more, or 55% or more, or may be about 80% or less, 75% or less, 70% or less, or 65% or less.

In each of the first and second polymer film substrates, a ratio (CTE2/CTE1) of a coefficient of thermal expansion (CTE2) in the second direction to a coefficient of thermal expansion (CTE1) in the first direction (for example, the above-described slow axis direction or TD direction) may be 1.5 or more. The coefficients of thermal expansion (CTE1, CTE2) are each a value confirmed within a temperature range of 40° C. to 80° C. In another example, the ratio (CTE2/CTE1) may be about 2 or more, about 2.5 or more, 3 or more, or 3.5 or more, or may be 10 or less, 9 or less, 8 or less, 7 or less, 6 or less, 5 or less, or 4 or less.

The coefficient of thermal expansion (CTE2) in the second direction may be in a range of 5 to 150 ppm/° C. The coefficient of thermal expansion may be about 10 ppm/° C. or more, 15 ppm/° C. or more, 20 ppm/° C. or more, 25 ppm/° C. or more, 30 ppm/° C. or more, 35 ppm/° C. or more, 40 ppm/° C. or more, 45 ppm/° C. or more, 50 ppm/° C. or more, 55 ppm/° C. or more, 60 ppm/° C. or more, 65 ppm/° C. or more, 70 ppm/° C. or more, 75 ppm/° C. or more, or 80 ppm/° C. or more, or may be 140 ppm/° C. or less, 130 ppm/° C. or less, 120 ppm/° C. or less, 100 ppm/° C. or less, 95 ppm/° C. or less, 90 ppm/° C. or less, 85 ppm/° C. or less, 80 ppm/° C. or less, 40 ppm/° C. or less, 30 ppm/° C. or less, or 25 ppm/° C. or less.

In each of the first and second polymer film substrates, a ratio (YM1/YM2) of an elastic modulus (YM1) in the first direction (for example, the above-described slow axis direction or TD direction) to an elastic modulus (YM2) in the second direction may be 1.5 or more. In another example, the ratio (YM1/YM2) may be about 2 or more, or may be 10 or less, 9 or less, 8 or less, 7 or less, 6 or less, 5 or less, 4 or less, 3 or less or 2.5 or less.

The elastic modulus (YM1) in the first direction (for example, the above-described slow axis direction or TD direction) may be in a range of about 2 to 10 GPa. In another example, the elastic modulus (YM1) may be about 2.5 GPa or more, 3 GPa or more, 3.5 GPa or more, 4 GPa or more, 4.5 GPa or more, 5 GPa or more, or 5.5 GPa or more, or may also be about 9.5 GPa or less, 9 GPa or less, 8.5 GPa or less, 8 GPa or less, 7.5 GPa or less, 7 GPa or less, 6.5 GPa or less, or 6 GPa or less.

The elastic modulus is a so-called Young's modulus, which is measured according to the method of the example described below.

In each of the first and second polymer film substrates, a ratio (MS1/MS2) of a maximum stress (MS1) in the first direction (for example, the above-described slow axis direction or TD direction) to a maximum stress (MS2) in the second direction may be 1.5 or more. In another example, the ratio (MS1/MS2) may be about 2 or more, or may be 10 or less, 9 or less, 8 or less, 7 or less, 6 or less, 5 or less, 4 or less, 3 or less, or 2.5 or less.

The maximum stress (MS1) in the first direction (for example, the above-described slow axis direction or TD direction) may be in a range of about 80 to 300 MPa. In another example, the maximum stress (MS1) may be about 90 MPa or more, about 100 MPa or more, about 110 MPa or more, about 120 MPa or more, about 130 MPa or more, about 140 MPa or more, about 150 MPa or more, about 155 MPa or more, 160 MPa or more, 165 MPa or more, 170 MPa or more, 175 MPa or more, or 180 MPa or more, or may also be about 300 MPa or less, about 290 MPa or less, about 280 MPa or less, about 270 MPa or less, about 260 MPa or less, about 250 MPa or less, about 245 MPa or less, 240 MPa or less, 235 MPa or less, 230 MPa or less, 225 MPa or less, 220 MPa or less, 215 MPa or less, 210 MPa or less, 205 MPa or less, 200 MPa or less, 195 MPa or less, or 190 MPa or less.

In the light modulation device of the present application, an absolute value of the angle formed by the first direction of the first polymer film substrate and the first direction of the second polymer film substrate may be in a range of 0 degrees to 10 degrees or 0 degrees to 5 degrees, or the first directions may be approximately horizontal to each other. The first direction may be the slow axis direction or the TD direction of the polymer film substrate as described above.

As the device is configured by disposing polymer film substrates having asymmetric optical and mechanical properties so as to have such a specific relationship as described above, the present application can realize excellent optical and mechanical properties.

Although the reason why such an effect is realized is not clear, it is assumed that it is because a better balance of optical and mechanical properties is secured by controlling the large asymmetry, in which at least two polymer film substrates have, similarly and again disposing both asymmetry to be symmetric based on a specific axis, as compared with application of a film having an isotropic structure.

The thickness of each of the first and second polymer film substrates is not particularly limited, which may be set in an appropriate range depending on the purpose. Typically, the thickness may be in a range of about 10 μm to 200 μm.

As described above, a representative example of the polymer film having large optical and mechanical asymmetry as above is a stretched PET (polyethyleneterephtalate) film known as a so-called high stretched polyester film or the like, and such a film is easily available in the industry.

Usually, the stretched PET film is a uniaxially stretched film of one or more layers produced by forming a PET-based resin into a film with melting/extruding, and stretching it or a biaxially stretched film of one or more layers produced by longitudinally and transversely stretching it after film formation.

The PET-based resin generally means a resin in which 80 mol % or more of the repeating units are ethylene terephthalate, which may also contain other dicarboxylic acid components and diol components. Other dicarboxylic acid components are not particularly limited, but may include, for example, isophthalic acid, p-beta-oxyethoxybenzoic acid, 4,4'-dicarboxydiphenyl, 4,4'-dicarboxybenzophenone, bis(4-carboxyphenyl)ethane, adipic acid, sebacic acid and/or 1,4-dicarboxycyclohexane, and the like.

Other diol components are not particularly limited, but may include propylene glycol, butanediol, neopentyl glycol, diethylene glycol, cyclohexanediol, ethylene oxide adducts of bisphenol A, polyethylene glycol, polypropylene glycol and/or polytetramethylene glycol, and the like.

The dicarboxylic acid component or the diol component may be used in combination of two or more as necessary. Furthermore, an oxycarboxylic acid such as p-oxybenzoic acid may also be used in combination. In addition, as other copolymerization components, a dicarboxylic acid component containing a small amount of amide bonds, urethane bonds, ether bonds and carbonate bonds, and the like, or a diol component may also be used.

As a production method of the PET-based resin, a method of directly polycondensing terephthalic acid, ethylene glycol and/or, as necessary, other dicarboxylic acids or other diols, a method of transesterifying dialkyl ester of terephthalic acid and ethylene glycol and/or, as necessary, dialkyl esters of other dicarboxylic acids or other diols and then polycondensing them, and a method of polycondensing terephtalic acid and/or, as necessary, ethylene glycol esters of other dicarboxylic acids and/or, as necessary, other diolesters, and the like are adopted.

For each polymerization reaction, a polymerization catalyst containing an antimony-based, titanium-based, germanium-based or aluminum-based compound, or a polymerization catalyst containing the composite compound can be used.

The polymerization reaction conditions can be appropriately selected depending on monomers, catalysts, reaction apparatuses and intended resin physical properties, and are not particularly limited, but for example, the reaction temperature is usually about 150° C. to about 300° C., about 200° C. to about 300° C. or about 260° C. to about 300° C. Furthermore, the reaction pressure is usually atmospheric pressure to about 2.7 Pa, where the pressure may be reduced in the latter half of the reaction.

The polymerization reaction proceeds by volatilizing leaving reactants such as a diol, an alkyl compound or water.

The polymerization apparatus may also be one which is completed by one reaction tank or connects a plurality of reaction tanks. In this case, the reactants are polymerized while being transferred between the reaction tanks, depending on the degree of polymerization. In addition, a method, in which a horizontal reaction apparatus is provided in the latter half of the polymerization and the reactants are volatilized while heating/kneading, may also be adopted.

After completion of the polymerization, the resin is discharged from the reaction tank or the horizontal reaction apparatus in a molten state, and then, obtained in the form of flakes cooled and pulverized in a cooling drum or a cooling belt, or in the form of pellets tailored after being introduced into an extruder and extruded in a string shape. Furthermore, solid-phase polymerization may be performed as needed, thereby improving the molecular weight or decreasing the low molecular weight component. As the low molecular weight component that may be contained in the PET resin, a cyclic trimer component may be exemplified, but the content of such a cyclic trimer component in the resin is usually controlled to 5,000 ppm or less, or 3,000 ppm or less.

The molecular weight of the PET-based resin is usually in a range of 0.45 to 1.0 dL/g, 0.50 to 1.0 dL/g or 0.52 to 0.80 dL/g, when the resin has been dissolved in a mixed solvent of phenol/tetrachloroethane=50/50 (weight ratio) and it has been represented as a limiting viscosity measured at 30° C.

In addition, the PET-based resin may contain additives as required. The additive may include a lubricant, an anti-blocking agent, a heat stabilizer, an antioxidant, an antistatic agent, a light stabilizer and an impact resistance improver, and the like. The addition amount thereof is preferably within a range that does not adversely affect the optical properties.

The PET-based resin is used in the form of pellets assembled by an ordinary extruder, for formulation of such additives and film molding to be described below. The size and shape of the pellets are not particularly limited, but they are generally a cylindrical, spherical or flat spherical shape having both height and diameter of 5 mm or less. The PET-based resin thus obtained can be molded into a film form and subjected to a stretching treatment to obtain a transparent and homogeneous PET film having high mechanical strength. The production method thereof is not particularly limited, and for example, the following method is adopted.

Pellets made of the dried PET resin are supplied to a melt extrusion apparatus, heated to a melting point or higher and melted. Next, the melted resin is extruded from the die and quenched and solidified on a rotary cooling drum to a temperature below the glass transition temperature to obtain an un-stretched film in a substantially amorphous state. This melting temperature is determined according to the melting point of the PET-based resin to be used or the extruder, which is not particularly limited, but is usually 250° C. to 350° C. In order to improve planarity of the film, it is also preferred to enhance adhesion between the film and the rotary cooling drum, and an adhesion method by electrostatic application or an adhesion method by liquid coating is preferably adopted. The adhesion method by electrostatic application is usually a method in which linear electrodes are provided on the upper surface side of a film in a direction perpendicular to the flow of the film and a direct current voltage of about 5 to 10 kV is applied to the electrodes to provide static charges to the film, thereby improving the adhesion between the rotary cooling drum and the film. In addition, the adhesion method by liquid coating is a method for improving the adhesion between the rotary cooling drum and the film by uniformly coating a liquid to all or a part (for example, only the portion in contact with both film ends) of the surface of the rotary cooling drum. Both of them may also be used in combination if necessary. The PET-based resin to be used may be mixed with two or more resins, or resins having different structures or compositions, if necessary. For example, it may include using a mixture of pellets blended with a particulate filling material as an anti-blocking agent, an ultraviolet absorbing agent or an antistatic agent, and the like, and non-blended pellets, and the like.

Furthermore, the laminating number of films to be extruded may also be two or more layers, if necessary. For example, it may include that pellets blended with a particulate filling material as an anti-blocking agent and non-blended pellets are prepared and supplied from the other extruder to the same die to extrude a film composed of two kinds and three layers, "blended with filling material/no-blended/blended with filling material," and the like.

The un-stretched film is usually stretched longitudinally at a temperature not lower than the glass transition temperature in the extrusion direction first. The stretching temperature is usually 70 to 150° C., 80 to 130° C., or 90 to 120° C. In addition, the stretching ratio is usually 1.1 to 6 times or 2 to 5.5 times. The stretching may be terminated once or divided into more than once as necessary.

The longitudinally stretched film thus obtained may be subjected to a heat treatment thereafter. Then, a relaxation treatment may be performed if necessary. The heat treatment temperature is usually 150 to 250° C., 180 to 245° C. or 200 to 230° C. Also, the heat treatment time is usually 1 to 600 seconds or 1 to 300 seconds or 1 to 60 seconds.

The temperature of the relaxation treatment is usually 90 to 200° C. or 120 to 180° C. Also, the amount of relaxation is usually 0.1 to 20% or 2 to 5%. The relaxation treatment temperature and the relaxation amount can be set so that a heat shrinkage rate of the PET film after relaxation treatment at 150° C. is 2% or less.

In the case of obtaining uniaxially stretched and biaxially stretched films, transverse stretching is usually performed by a tenter after the longitudinal stretching treatment or after the heat treatment or relaxation treatment, if necessary. The stretching temperature is usually 70 to 150° C., 80 to 130° C., or 90 to 120° C. In addition, the stretching ratio is usually 1.1 to 6 times or 2 to 5.5 times. Thereafter, the heat treatment and, if necessary, the relaxation treatment can be performed. The heat treatment temperature is usually 150 to 250° C. or 180 to 245° C. or 200 to 230° C. The heat treatment time is usually 1 to 600 seconds, 1 to 300 seconds, or 1 to 60 seconds.

The temperature of the relaxation treatment is usually 100 to 230° C., 110 to 210° C. or 120 to 180° C. Also, the relaxation amount is usually 0.1 to 20%, 1 to 10%, or 2 to 5%. The relaxation treatment temperature and the relaxation amount can be set so that the heat shrinkage rate of the PET film after the relaxation treatment at 150° C. is 2% or less.

In uniaxial stretching and biaxial stretching treatments, in order to alleviate deformation of the orientation main axis as represented by bowing, the heat treatment can be performed again or the stretching treatment can be performed after the transverse stretching. The maximum value of deformation in the orientation main axis by bowing with respect to the stretching direction is usually within 45 degrees, within 30 degrees, or within 15 degrees. Here, the stretching direction also refers to a stretching large direction in longitudinal stretching or transverse stretching.

In the biaxial stretching of the PET film, the transverse stretching ratio is usually slightly larger than the longitudinal stretching ratio, where the stretching direction refers to a direction perpendicular to the long direction of the film. Also, the uniaxial stretching is usually stretched in the transverse direction as described above, where the stretching direction equally refers to a direction perpendicular to the long direction.

Also, the orientation main axis refers to a molecular orientation direction at any point on the stretched PET film. Furthermore, the deformation of the orientation main axis with respect to the stretching direction refers to an angle difference between the orientation main axis and the stretching direction. In addition, the maximum value thereof refers to a maximum value of the values on the vertical direction with respect to the long direction.

The direction of identifying the orientation main axis is known, and for example, it can be measured using a retardation film/optical material inspection apparatus RETS (manufactured by Otsuka Densi KK) or a molecular orientation system MOA (manufactured by Oji Scientific Instruments).

The stretched PET film used in the present application may be imparted with antiglare properties (haze). The method of imparting antiglare properties is not particularly limited, and for example, a method of mixing inorganic particulates or organic particulates into the raw resin to form a film, a method of forming a stretched film from an un-stretched film having a layer, in which inorganic particulates or organic particulates are mixed, on one side, based on the method of producing the film, or a method of coating a coating liquid formed by mixing inorganic particulates or organic particulates with a curable binder resin on one side of a stretched PET film and curing the binder resin to form an antiglare layer, and the like is adopted.

The inorganic particulates for imparting antiglare properties are not particularly limited, but may include, for example, silica, colloidal silica, alumina, alumina sol, an aluminosilicate, an alumina-silica composite oxide, kaolin, talc, mica, calcium carbonate, and the like. Also, the organic particulates are not particularly limited, but may include, for example, crosslinked polyacrylic acid particles, methyl methacrylate/styrene copolymer resin particles, crosslinked polystyrene particles, crosslinked polymethyl methacrylate particles, silicone resin particles and polyimide particles, and the like. The antiglare property-imparted stretched PET film thus obtained may have a haze value in a range of 6 to 45%.

A functional layer such as a conductive layer, a hard coating layer and a low reflective layer may be further laminated on the antiglare property-imparted stretched PET film. Furthermore, as the resin composition constituting the antiglare layer, a resin composition having any one of these functions may also be selected.

The haze value can be measured using, for example, a haze-permeability meter HM-150 (manufactured by Murakami Color Research Laboratory, Co., Ltd.) in accordance with JIS K 7136. In the measurement of the haze value, in order to prevent the film from being warped, for example, a measurement sample in which the film surface is bonded to a glass substrate using an optically transparent pressure-sensitive adhesive so that the antiglare property-imparted surface becomes the surface can be used.

The functional layer other than the antiglare layer or the like can be laminated on one side or both sides of the stretched PET film used in the present application, unless it interferes with the effect of the present application. The functional layer to be laminated may include, for example, a conductive layer, a hard coating layer, a smoothing layer, an easily slipping layer, an anti-blocking layer and an easy adhesion layer, and the like.

The above-described method for producing a PET film is one exemplary method for obtaining the polymer film substrate of the present application, where as long as the polymer film substrate applicable in the present application has the above-described physical properties, any kind of commercially available product can also be used.

In one example, the polymer film substrate may be a film substrate that an electrode layer is formed on one side. Such a film substrate may be referred to as an electrode film substrate. The above-mentioned retardation or mechanical properties, and the like may be for the polymer film substrate on which the electrode layer is not formed, or for the electrode film substrate.

In the case of the electrode film substrate, each of electrode layers may be formed on at least one side of the polymer film substrate, and first and second polymer film substrates may be disposed so that the electrode layers face each other.

As the electrode layer, a known transparent electrode layer may be applied, and for example, a so-called conductive polymer layer, a conductive metal layer, a conductive nanowire layer, or a metal oxide layer such as ITO (indium tin oxide) may be used as the electrode layer. Besides, various materials and forming methods capable of forming a transparent electrode layer are known, which can be applied without limitation.

In addition, an alignment film may be formed on one side of the polymer film substrate, for example, the upper part of the electrode layer in the case of the electrode film substrate. A known liquid crystal alignment film can be formed as the alignment film, and the kind of alignment film that can be applied according to a desired mode is known.

As described above, in the present application, the light modulation layer included in the light modulation film layer is a functional layer capable of changing the transmittance, reflectivity and/or haze of light depending on whether or not an external signal is applied. Such a light modulation layer in which the state of light changes depending on whether or not an external signal is applied, or the like, can be referred to as an active light modulation layer herein. In one example, when the light modulation layer is a layer containing a liquid crystal compound, the light modulation layer may be referred to as an active liquid crystal layer, where the active liquid crystal layer means a liquid crystal layer in a form that the liquid crystal compound can be changed in the active liquid crystal layer by application of the external signal. Also, the light modulation film layer comprising the active liquid crystal layer may be referred to as an active liquid crystal film layer.

The external signal herein may mean any external factors, such as an external voltage, that may affect the behavior of a material contained in the light modulation layer, for example, a light modulating material. Therefore, the state without external signal may mean a state where no external voltage or the like is applied.

In the present application, the type of the light modulation layer is not particularly limited as long as it has the above-described functions, and a known light modulation layer can be applied. In one example, the light modulation layer may be a liquid crystal layer, and a structure including a liquid crystal layer between the first and second polymer film substrates arranged opposite to each other may also be referred to as a liquid crystal cell herein.

An exemplary light modulation device can have excellent durability against gas permeability. In one example, the light modulation device may have a void generation rate of 20% or less upon being stored at a temperature of 60° C. and 85% relative humidity. The void generation rate may mean a percentage of the number of void generation samples relative to the number of samples used in the void generation evaluation. In another example, the first and second polymer film substrates may be substrates heat-treated at a temperature of 130° C. for 1 hour, where the light modulation device comprising such polymer film substrates may not cause voids due to the inflow of external gas for 500 hours when stored at a temperature of 60° C. and 85% relative humidity. This can be achieved by disposing the transverse directions of the first and second polymer film substrates so as to be parallel to each other, as described above.

In one example, the light modulation layer may be an active liquid crystal layer comprising liquid crystal molecules (liquid crystal host) and dichroic dyes. Such a liquid crystal layer may be referred to as a guest host liquid crystal layer (GHLC layer). In this case, the structure comprising the light modulation layer between the polymer film substrates may be referred to as an active liquid crystal film layer. In this specification, the term "GHLC layer" may mean a layer that dichroic dyes may be arranged together depending on arrangement of liquid crystal molecules to exhibit anisotropic light absorption characteristics with respect to an alignment direction of the dichroic dyes and the direction perpendicular to the alignment direction, respectively. For example, the dichroic dye is a substance whose absorption rate of light varies with a polarization direction, where if the absorption rate of light polarized in the long axis direction is large, it may be referred to as a p-type dye, and if the absorption rate of polarized light in the short axis direction is large, it may be referred to as an n-type dye. In one example, when a p-type dye is used, the polarized light vibrating in the long axis direction of the dye may be absorbed and the polarized light vibrating in the short axis direction of the dye may be less absorbed to be transmitted. Hereinafter, unless otherwise specified, the dichroic dye is assumed to be a p-type dye, but the type of the dichroic dye applied in the present application is not limited thereto.

In one example, the GHLC layer may function as an active polarizer. In this specification, the term "active polarizer" may mean a functional element capable of controlling anisotropic light absorption depending on application of external action. For example, the active GHLG layer can control the anisotropic light absorption for the polarized light in the direction parallel to the arrangement direction of dichroic dyes and the polarized light in the vertical direction by controlling the arrangement of liquid crystal molecules and dichroic dyes. Since the arrangement of liquid crystal molecules and dichroic dyes can be controlled by the application of external action such as a magnetic field or an electric field, the active GHLC layer can control anisotropic light absorption depending on the application of external action.

The kind and physical properties of the liquid crystal molecules can be appropriately selected in consideration of the object of the present application.

In one example, the liquid crystal molecules may be nematic liquid crystals or smectic liquid crystals. The nematic liquid crystals may mean liquid crystals in which rod-like liquid crystal molecules have no regularity about positions but are arranged in parallel to the long axis direction of the liquid crystal molecules, and the smectic liquid crystals may mean liquid crystals in which rod-like liquid crystal molecules are regularly arranged to form a layered structure and are aligned in parallel with the regularity in the long axis direction. According to one example of the present application, nematic liquid crystals may be used as the liquid crystal molecules.

In one example, the liquid crystal molecules may be non-reactive liquid crystal molecules. The non-reactive liquid crystal molecules may mean liquid crystal molecules having no polymerizable group. Here, the polymerizable group may be exemplified by an acryloyl group, an acryloyloxy group, a methacryloyl group, a methacryloyloxy group, a carboxyl group, a hydroxyl group, a vinyl group or an epoxy group, and the like, but is not limited thereto, and a known functional group known as the polymerizable group may be included.

The refractive index anisotropy of the liquid crystal molecules can be appropriately selected in consideration of target physical properties, for example, variable transmittance characteristics. In this specification, the term "refractive index anisotropy" may mean a difference between an extraordinary refractive index and an ordinary refractive index of liquid crystal molecules. The refractive index anisotropy of the liquid crystal molecules may be, for example, in a range of 0.01 to 0.3. The refractive index anisotropy may be 0.01 or more, 0.05 or more, 0.07 or more, 0.09 or more, or 0.1 or more, and may be 0.3 or less, 0.2 or less, 0.15 or less, 0.14 or less, or 0.13 or less.

When the refractive index anisotropy of the liquid crystal molecules is within the above range, it is possible to provide a light modulation device having excellent variable transmittance characteristics. In one example, the lower the refractive index of the liquid crystal molecules is in the above range, the light modulation device having more excellent variable transmittance characteristics can be provided.

The dielectric constant anisotropy of the liquid crystal molecules may have positive dielectric constant anisotropy or negative dielectric anisotropy in consideration of a driving method of a target liquid crystal cell. In this specification, the term "dielectric constant anisotropy" may mean a difference between an extraordinary dielectric constant (ce) and an ordinary dielectric constant (co) of the liquid crystal molecules. The dielectric constant anisotropy of the liquid crystal molecules may be, for example, in a range within ±40, within ±30, within ±10, within ±7, within ±5 or within ±3. When the dielectric constant anisotropy of the liquid crystal molecules is controlled within the above range, it may be advantageous in terms of driving efficiency of the light modulation device.

The liquid crystal layer may comprise a dichroic dye. The dye may be included as a guest material. The dichroic dye may serve, for example, to control the transmittance of the light modulation device depending on orientation of a host material. In this specification, the term "dye" may mean a material capable of intensively absorbing and/or deforming light in at least a part or all of the ranges within a visible light region, for example, within a wavelength range of 400 nm to 700 nm, and the term "dichroic dye" may mean a material capable of anisotropic absorption of light in at least a part or all of the ranges of the visible light region.

As the dichroic dye, for example, a known dye known to have properties that can be aligned depending on the alignment state of the liquid crystal molecules by a so-called host guest effect can be selected and used. An example of such a dichroic dye includes a so-called azo dye, an anthraquinone dye, a methine dye, an azomethine dye, a merocyanine dye, a naphthoquinone dye, a tetrazine dye, a phenylene dye, a quaterrylene dye, a benzothiadiazole dye, a diketopyrrolopyrrole dye, a squalene dye or a pyromethene dye, and the like, but the dye applicable in the present application is not limited thereto. As the dichroic dye, for example, a black dye can be used. Such a dye is known, for example, as an azo dye or an anthraquinone dye, and the like, but is not limited thereto.

As the dichroic dye, a dye having a dichroic ratio, that is, a value obtained by dividing the absorption of the polarized light parallel to the long axis direction of the dichroic dye by the absorption of the polarized light parallel to the direction perpendicular to the long axis direction, of 5 or more, 6 or more, or 7 or more, can be used. The dye may satisfy the dichroic ratio in at least a part of the wavelengths or any one wavelength within the wavelength range of the visible light region, for example, within the wavelength range of about 380 nm to 700 nm or about 400 nm to 700 nm. The upper limit of the dichroic ratio may be, for example, 20 or less, 18 or less, 16 or less, or 14 or less or so.

The content of the dichroic dye in the liquid crystal layer can be appropriately selected in consideration of the object of the present application. For example, the content of the dichroic dye in the liquid crystal layer may be 0.1 wt % or more, 0.25 wt % or more, 0.5 wt % or more, 0.75 wt % or more, 1 wt % or more, 1.25 wt % or more, or 1.5 wt % or more. The upper limit of the content of the dichroic dye in the liquid crystal layer may be, for example, 5.0 wt % or less, 4.0 wt % or less, 3.0 wt % or less, 2.75 wt % or less, 2.5 wt % or less, 2.25 wt % or less, 2.0 wt % or less, 1.75 wt % or less, or 1.5 wt % or less. When the content of the dichroic dye in the liquid crystal layer satisfies the above range, it is possible to provide a light modulation device having excellent variable transmittance characteristics. In one example, the higher the content of the dichroic dye is in the above range, the light modulation device having more excellent variable transmittance characteristic can be provided.

In the liquid crystal layer, the total weight of the liquid crystal molecules and the dichroic dye may be, for example, about 60 wt % or more, 65 wt % or more, 70 wt % or more, 75 wt % or more, 80 wt % or more, 85 wt % or more, 90 wt % or more, or 95 wt % or more, and in another example, it may be less than about 100 wt %, 98 wt % or less, or 96 wt % or less.

The liquid crystal layer can switch the orientation state depending on whether or not a voltage is applied. The voltage may be applied to a direction vertical to the polymer film substrate.

In one example, the liquid crystal layer can switch at least between a horizontal orientation state, a twisted orientation state and a vertical orientation state.

For example, the liquid crystal layer may be present in a horizontal orientation state when no voltage is applied, and may be present in a vertical orientation state when a voltage is applied. Such a liquid crystal cell may be referred to as an ECB (electrically controllable birefringence) mode liquid crystal cell.

The liquid crystal molecules in the horizontally oriented liquid crystal layer may be present in a state where a light axis is approximately horizontally aligned with the plane of the liquid crystal layer. For example, the light axes of the liquid crystal molecules may form an angle in a range of about 0 to 20 degrees, 0 to 15 degrees, 0 to 10 degrees, or 0 to 5 degrees, or of about 0 degrees with respect to the plane of the liquid crystal layer. The light axes of the liquid crystal molecules in the horizontally aligned liquid crystal layer may be parallel to each other and may form, for example, an angle in the range of 0 to 10 degrees, 0 to 5 degrees, or of about 0 degrees.

The liquid crystal molecules in the vertically oriented liquid crystal layer may be present in a state where the light axes are approximately arranged perpendicular to the plane of the liquid crystal layer. For example, the light axes of the liquid crystal molecules may form an angle in a range of about 70 to 90 degrees, 75 to 90 degrees, 80 to 90 degrees or 85 to 90 degrees, or of about 90 degrees with respect to the plane of the liquid crystal layer. The light axes of the liquid crystal molecules in the vertically oriented liquid crystal layer may be parallel to each other and may form an angle in the range of, for example, 0 to 10 degrees or 0 to 5 degrees, or of about 0 degrees.

The thickness of the liquid crystal layer may be appropriately selected in consideration of the object of the present application. The thickness of the liquid crystal layer may be, for example, about 0.01 μm or more, 0.1 μm or more, 1 μm or more, 2 μm or more, 3 μm or more, 4 μm or more, 5 μm or more, 6 μm or more, 7 μm or more, 8 μm or more, 9 μm or more, or 10 μm or more. The upper limit of the thickness of the liquid crystal layer may be, for example, about 30 μm or less, 25 μm or less, 20 μm or less, or 15 μm or less. When the thickness of the liquid crystal layer satisfies the above range, it is possible to provide a light modulation device having excellent variable transmittance characteristics. In one example, the thinner the thickness of the liquid crystal layer is in the above range, the light modulation device having more excellent variable transmittance characteristics can be provided.

The light modulation device may further comprise first and second alignment films present inside the first and second polymer film substrates, respectively, as the above-described alignment film. In this specification, the inside of the first and second polymer film substrates may mean a side where the light modulation layer is present, and the outside may mean the opposite side to the side where the light modulation layer is present.

In one example, the first and second alignment films may all be horizontal alignment films.

The light modulation device can adjust the transmittance, reflectance and haze by adjusting the orientation state of the liquid crystal layer according to whether or not a voltage is applied. The orientation state of the liquid crystal layer can be controlled by a pretilt of the alignment film.

In this specification, the pretilt may have an angle and a direction. The pretilt angle may be referred to as a polar angle, and the pre-tilt direction may also be referred to as an azimuthal angle.

The pretilt angle may mean an angle in which the light axis of the liquid crystal molecule forms with respect to a horizontal plane of the alignment film. In one example, the vertical alignment film may have a pretilt angle of about 70 degrees to 90 degrees, 75 degrees to 90 degrees, 80 degrees to 90 degrees, or 85 degrees to 90 degrees. In one example, the pretilt angle of the horizontal alignment film may be about 0 to 20 degrees, 0 to 15 degrees, 0 to 10 degrees, or 0 to 5 degrees.

The pretilt direction may mean a direction in which the light axis of the liquid crystal molecule is projected on a horizontal plane of the alignment film. The pretilt direction may be an angle formed by the projected direction and the horizontal axis (WA) of the liquid crystal layer. In this specification, the horizontal axis (WA) of the liquid crystal layer may mean a direction parallel to the long axis direction of the liquid crystal layer, or a direction parallel to the line connecting both eyes of an observer wearing eyewear or an observer observing a display device when a light modulation device is applied to the eyewear or the display device such as a TV.

The pretilt directions of the first alignment film and the second alignment film can be appropriately adjusted in consideration of the orientation of the liquid crystal layer. In one example, the pretilt directions of the first alignment film and the second alignment film may be parallel to each other for horizontal orientation upon no voltage application. When the pretilt directions of the first alignment film and the second alignment film are parallel to each other, the pretilt directions of the first alignment film and the second alignment film may be anti-parallel to each other, and for example, may be in a range of 170 degrees to 190 degrees, 175 degrees to 185 degrees, or about 180 degrees to each other.

The alignment film can be selected and used without particular limitation as long as it has orientation ability with respect to adjacent liquid crystal layers. As the alignment film, for example, a contact type alignment film such as a rubbing alignment film or a photo alignment film known to be capable of exhibiting orientation properties by a non-contact method such as irradiation of linearly polarized light by including a photo alignment film compound can be used.

It is known to adjust the pretilt direction and angle of the rubbing alignment film or the photo alignment film. In the case of the rubbing alignment film, the pretilt direction can be parallel to the rubbing direction, and the pretilt angle can be achieved by controlling the rubbing conditions, for example, the pressure condition upon rubbing, the rubbing intensity, and the like. In the case of the photo alignment film, the pretilt direction can be controlled by the direction of polarized light to be irradiated and the like, and the pretilt angle can be controlled by the angle of light irradiation, the intensity of light irradiation, and the like.

In one example, each of the first and second alignment films may be a rubbing alignment film. When the rubbing directions of the first and second alignment films are disposed to be parallel to each other, the rubbing directions of the first and second alignment films may be anti-parallel to each other, and for example, the rubbing directions, that is, the orientation directions may form an angle in a range of 170 degrees to 190 degrees, 175 degrees to 185 degrees, or about 180 degrees to each other. The rubbing direction can be confirmed by measuring the pretilt angle, and since the liquid crystals generally lie along the rubbing direction and simultaneously generate the pretilt angle, it is possible to measure the rubbing direction by measuring the pretilt angle. In one example, the transverse directions of the first and second polymer film substrates may each be parallel to the rubbing axis of any one of the first and second alignment films.

The light modulation device may further comprise, as the electrode layers, first and second electrode layers present inside the first and second polymer film substrates, respectively. When the light modulation device comprises the first and second alignment films, the first electrode layer may exist between the first polymer film substrate and the first alignment film, and the second electrode layer may exist between the second polymer film substrate and the second alignment film.

When the polymer film substrate is the above-described electrode film substrate, the electrode layer formed on the electrode film substrate may serve as the electrode layer.

The light modulation device may further comprise an antireflective layer. In one example, the light modulation device may further comprise first and/or second antireflective layers present outside the first and/or second polymer film substrates, respectively. As the antireflective layer, a known antireflective layer may be used in consideration of the object of the present application, and for example, an acrylate layer may be used. The antireflective layer may have a thickness of, for example, 200 nm or less, or 100 nm or less.

The light modulation device may further comprise an ultraviolet absorbing layer. In one example, the light modulation device may further comprise first and second ultraviolet absorbing layers present outside the first and second polymer film substrates, respectively. As the ultraviolet absorbing layer, a known ultraviolet absorbing layer may be suitably selected and used in consideration of the object of the present application.

In one example, the light modulation device can be formed by directly coating the antireflective layer, the ultraviolet absorbing layer, and the like on the polymer film substrate. If the first and second polymer film substrates are used, it may be advantageous in terms of refractive index matching and coating process optimization. In this case, there are advantages that the process can be simplified and the thickness of the element can be reduced. In another example, in the light modulation device, the antireflective layer or the ultraviolet absorbing layer may be formed on one side of a base film, and the base film may be attached to the polymer film substrate via a pressure-sensitive adhesive or an adhesive.

The light modulation device can exhibit variable transmittance characteristics according to the orientation state of the liquid crystal layer depending on whether or not a voltage is applied. That is, the device can switch t between the transmission mode state and the blocking mode state as described above.

In one example, the light modulation device may have a difference between the transmittance upon applying a voltage of 15V and the transmittance upon no voltage application of 20% to 60%.

The light modulation device can be applied to various applications in which variable transmittance characteristics are required. The applications in which variable transmittance characteristics are required can be exemplified by openings in enclosed spaces including buildings, containers or vehicles, and the like, such as windows or sunroofs, or eyewear, and the like. Here, in the range of eyewear, all eyewear formed so that an observer can observe the outside through lenses, such as general glasses, sunglasses, sports goggles or helmets, or instruments for experiencing augmented reality, can be included.

A typical application to which the light modulation device of the present application can be applied is eyewear. Recently, for sunglasses, sports goggles, instruments for experiencing augmented reality, and the like, the eyewear in which a lens is mounted so as to be inclined with an observer's front visual line is commercially available. The light modulation device of the present application can also be effectively applied to the above-described eyewear.

When the light modulation device of the present application is applied to eyewear, the structure of the eyewear is not particularly limited. That is, the light modulation device may be mounted and applied in a lens for a left eye and/or a right eye having a known eyewear structure.

For example, the eyewear may comprise a left eye lens and a right eye lens; and a frame for supporting the left eye lens and the right eye lens.

FIG. 2 is an exemplary schematic diagram of the eyewear, which is a schematic diagram of the eyewear comprising the frame (82), and left eye and right eye lenses (84), but the structure of the eyewear to which the light modulation device of the present application can be applied is not limited to FIG. 2.

In the eyewear, the left eye lens and the right eye lens may each comprise the light modulation device. Such a lens may comprise only the light modulation device, or may also comprise other configurations.

Other configurations and designs of the eyewear are not particularly limited, and known methods can be applied.

Advantageous Effects

The present application can provide a light modulation device both excellent mechanical properties and optical properties by applying a polymer film that is also optically anisotropic and mechanically anisotropic as a substrate.

BRIEF DESCRIPTION OF DRAWINGS

FIG. 1 is a schematic diagram of an exemplary light modulation device of the present application.

FIG. 2 illustratively shows eyewear.

FIGS. 3 and 4 show durability evaluation results for Examples and Comparative Examples.

MODE FOR INVENTION

Hereinafter, the present application will be specifically described by way of Examples, but the scope of the present application is not limited by the following examples.

The polymer film substrates used in Examples or Comparative Examples are a PC (polycarbonate) film substrate (PC substrate, thickness: 100 μm, manufacturer: Teijin, product name: PFC100-D150), which is an isotropic film substrate usually applied as a substrate, and a PET (polyethylene terephthalate) film substrate (SRF substrate, thickness: 80 μm, manufacturer: Toyobo, product name: TA044), which is an asymmetric substrate according to the present application, and the following physical properties are the results of measurement in a state where an ITO (indium tin oxide) film having a thickness of about 20 nm is formed on one side of each film substrate.

Hereinafter, the present application will be specifically described by way of Examples, but the scope of the present application is not limited by the following examples.

The polymer film substrates used in Examples or Comparative Examples are a PC (polycarbonate) film substrate (PC substrate, thickness: 100 μm, manufacturer: Teijin, product name: PFC100-D150), which is an isotropic film substrate usually applied as a substrate, and a PET (polyethylene terephthalate) film substrate (SRF substrate, thickness: 80 μm, manufacturer: Toyobo, product name: TA044), which is an asymmetric substrate according to the present application, and the following physical properties are the results of measurement in a state where an ITO (indium tin oxide) film having a thickness of about 20 nm is formed on one side of each film substrate.

1. Phase Retardation Evaluation of Polymer Film Substrate

The in-plane retardation value (Rin) of the polymer film substrate was measured for light having a wavelength of 550 nm using a UV/VIS spectroscope 8453 instrument from Agilent Co., Ltd. according to the following method. Two sheets of polarizers were installed in the UV/VIS spectroscope so that their transmission axes were orthogonal to each other, and a polymer film was installed between the two sheets of polarizers so that its slow axis formed 45 degrees with the transmission axes of the two polarizers, respectively, and then the transmittance according to wavelengths was measured. The phase retardation order of each peak is obtained from the transmittance graph according to wavelengths. Specifically, a waveform in the transmittance graph according to wavelengths satisfies Equation A below, and the maximum peak (Tmax) condition in the sine waveform satisfies Equation B below. In the case of max in Equation A, since the T of Equation A and the T of Equation B are the same, the equations are expanded. As the equations are also expanded for n+1, n+2 and n+3, arranged for n and n+1 equations to eliminate R, and arranged for n into λn and λn+1 equations, the following Equation C is derived. Since n and λ can be known based on the fact that T of Equation A and T of Equation B are the same, R for each of λn, λn+1, λn+2 and λn+3 is obtained. A linear trend line of R values according to wavelengths for 4 points is obtained and the R value for the equation 550 nm is calculated. The function of the linear trend line is Y=ax+b, where a and b are constants. The Y value when 550 nm has been substituted for x of the function is the Rin value for light having a wavelength of 550 nm.

$$T=\sin^2[(2\pi R/\lambda)]  \quad\quad \text{[Equation A]}$$

$$T=\sin^2[((2n+1)\pi/2)]  \quad\quad \text{[Equation B]}$$

$$n=(\lambda n-3\lambda n+1)/(2\lambda n+1-2\lambda n)  \quad\quad \text{[Equation C]}$$

In the above, R denotes in-plane retardation (Rin), λ denotes a wavelength, and n denotes a nodal degree of a sine waveform.

2. Evaluation of Tensile Property and Coefficient of Thermal Expansion of Polymer Film Substrate A tensile strength test was conducted according to the standard by applying a force at a tensile speed of 10 mm/min at room temperature (25° C.) using UTM (Universal Testing Machine) equipment (Instron 3342) to measure the elastic modulus (Young's modulus), elongation and maximum stress of the polymer film substrate. In this case, each specimen was prepared by tailoring it to have a width of about 10 mm and a length of about 30 mm, and both ends in the longitudinal direction were each taped by 10 mm and fixed to the equipment, and then the evaluation was performed.

A length expansion test was conducted according to the standard while elevating the temperature from 40° C. to 80° C. at a rate of 10° C./min using TMA (thermomechanical analysis) equipment (Metteler toledo, SDTA840) to measure the coefficient of thermal expansion. Upon the measurement, the measurement direction length of the specimen was set to 10 mm and the load was set to 0.02 N.

The evaluation results of physical properties of each film substrate measured in the above manner are shown in Table 1 below.

In Table 1 below, MD and TD are MD (machine direction) and TD (transverse direction) directions of the PC substrate and the SRF substrate which are stretched films, respectively, and 45 is the direction forming 45 degrees with both the MD and TD directions.

TABLE 1

| | Direction | Rin (nm) | Elastic modulus (GPa) | Elongation (%) | Maximum Stress (MPa) | Coefficient of Thermal Expansion (ppm/° C.) |
|---|---|---|---|---|---|---|
| PC Substrate | MD | 12.1 | 1.6 | 13.6 | 63.4 | 119.19 |
| | TD | | 1.6 | 11.6 | 62.3 | 127.8 |
| SRF Substrate | MD | 14800 | 2.5 | 6.1 | 81.5 | 83.3 |
| | 45 | 15176 | 3.2 | 60.4 | 101.6 | 52.2 |
| | TD | 15049 | 5.8 | 44.7 | 184.6 | 21.6 |

Example 1

Two SRF substrates were used to manufacture a light modulation device. An alignment film was formed on an ITO (indium tin oxide) electrode layer of the SRF substrate (width: 15 cm, length: 5 cm) to prepare a first substrate. As the alignment film, one obtained by rubbing a polyimide-based horizontal alignment film (SE-7492, Nissan) having a thickness of 300 nm with a rubbing cloth was used. A second substrate was prepared in the same manner as the first substrate. The first and second substrates were disposed opposite to each other so that their alignment films faced each other, a GHLC mixture (MDA-16-1235, Merck) comprising a liquid crystal compound having a positive dielectric constant anisotropy with a refractive index anisotropy (ΔN) of 0.13 and a dichroic dye was positioned therebetween, and then the frame was sealed to prepare a light modulation device. Here, the TD directions (slow axis directions) of the first and second substrates were each 0 degrees based on the rubbing axis of the first substrate alignment film, and the rubbing directions of the first and second alignment films were horizontal to each other, but were anti-horizontal, that is, the rubbing direction of the first alignment film and the rubbing direction of the second alignment film were opposite to each other. The obtained light modulation layer was a guest host liquid crystal layer in an ECB (electrically controllable birefringence) mode, and the cell gap was 12 μm.

Comparative Example 1

A light modulation device was manufactured in the same manner as in Example 1, except that a PC substrate was applied as a substrate.

Test Example 1

Using the light modulation devices of Example 1 and Comparative Example 1, an eyewear element of the type shown in FIGS. 3 and 4 was manufactured, and a heat shock test was conducted in a state of bending the element. The heat shock test was performed by setting a step of raising the temperature of the eyewear from about −40° C. to 90° C. at a temperature increase rate of about 16.25° C./min and then maintaining it for 10 minutes, and again reducing the temperature from 90° C. to −40° C. at a temperature decrease rate of about 16.25° C./min and then maintaining it for 10 minutes as one cycle and repeating the cycle 500 times, where this test was conducted with the eyewear attached to a bending jig having a curvature radius of about 100R. FIG. 3 showed the case of Example 1 and FIG. 4 showed the case of Comparative Example 1, where in the case of Comparative Example 1, severe cracks were observed as in the drawing.

Comparative Example 2

A light modulation device was manufactured in the same manner as in Example 1, except that the first directions (TD directions) of the first and second substrates were set to 90 degrees to each other. At this time, based on the rubbing direction of the alignment film on the first substrate, the first direction of the first substrate was 0 degrees and the first direction of the second substrate was 90 degrees.

Comparative Example 3

A light modulation device was manufactured in the same manner as in Example 1, except that the first directions (TD directions) of the first and second substrates were set to 90 degrees to each other. At this time, based on the rubbing direction of the alignment film on the first substrate, the first direction of the first substrate was 45 degrees and the first direction of the second substrate was 135 degrees.

Test Example 2

The void generation was evaluated while the devices of Example 1, Comparative Examples 2 and 3 were each stored at 60° C. and 85% relative humidity, and the results were shown in Table 2 below. Specifically, it was evaluated whether or not the visually observed voids occurred in the light modulation layer while being kept under the above conditions. Generally, the size of the visually observed voids is about 10 μm.

TABLE 2

| | | Number of samples initially introduced | Number of bad void samples | Number of good void samples | Void incidence | First occurrence time of void |
|---|---|---|---|---|---|---|
| Comparative Example | 2 | 12 | 12 | 0 | 100% | 120 h |
| | 3 | 12 | 12 | 0 | 100% | 144 h |
| Example 1 | | 12 | 1 | 11 | 8% | 504 h |

As results of Table 2, in the case of Comparative Examples 2 and 3, voids were observed within 500 hours in all of the initially introduced samples to show the void incidence of 100%, and the times when the voids were first observed were also within 120 hours and 144 hours, respectively.

On the other hand, in the case of Example 1, voids were not observed within 500 hours, and the time when the voids were first observed was also about 504 hours.

Test Example 3

An electro-optical characteristic and occurrence of a rainbow phenomenon were evaluated for the light modulation device produced in Example 1. The electro-optical characteristic was evaluated for the light modulation device by measuring a change in transmittance depending on whether or not a voltage was applied. Specifically, the transmittance according to the applied voltage was measured using a haze meter (NDH5000SP, Secos) while an AC power was connected to the electrode layers of the electrode film substrates and driven. The transmittance is average transmittance for light having a wavelength of 380 nm to 780 nm.

The evaluation of the rainbow phenomenon is a cognitive evaluation, and it has been evaluated that the rainbow phenomenon occurs when two or more patterns representing different luminance rather than the same luminance in the sample are generated.

As a result of the evaluation, no rainbow phenomenon was observed in the samples of Example 1, and it was confirmed that the transmittance upon no voltage application was about 33.6% and the transmittance upon voltage application (15V) was about 62.6%.

The invention claimed is:

1. A light modulation device comprising:
a first polymer film substrate and second polymer film substrate disposed opposite to each other, and
an active liquid crystal film layer having an active liquid crystal layer which is disposed between the first polymer film substrate and the second polymer film substrate,
wherein the active liquid crystal film layer contains a liquid crystal host and a dichroic dye guest,
wherein the active liquid crystal layer is configured to switch between a horizontal orientation state and a vertical orientation state,
each of the first polymer film substrate and the second polymer film substrate has an in-plane retardation of 4,000 nm or more for light having a wavelength of 550 nm,
each of the polymer film substrates has a ratio (E1/E2) of an elongation (E1) in a first direction to an elongation (E2) in a second direction perpendicular to the first direction of 3 or more, and
the first polymer film substrate and the second polymer film substrate are disposed so that an angle formed by the first direction of the first polymer film substrate and the first direction of the second polymer film substrate is in a range of 0 degrees to 10 degrees.

2. The light modulation device according to claim 1, wherein each of the first polymer film substrate and second polymer film substrate is an electrode film substrate in which an electrode layer is formed on one side, and the first polymer film substrate and second polymer film substrate are disposed so that the electrode layers of the first polymer film substrate and the electrode layer of the second polymer film substrate face each other.

3. The light modulation device according to claim 1, wherein the first polymer film substrate and second polymer film substrate are polyester film substrates.

4. The light modulation device according to claim 1, wherein each of the first polymer film substrate and second polymer film substrate has the elongation (E1) in the first direction of 20% or more.

5. The light modulation device according to claim 1, wherein each of the first polymer film substrate and second polymer film substrate has an elongation (E3) in a third direction, wherein an angle formed with both the first and second directions is in a range of 40 degrees to 50 degrees,
the elongation (E3) in a third direction is larger than the elongation (E1) in the first direction, and a ratio (E3/E2) of the elongation (E3) in the third direction to the elongation (E2) in the second direction is 5 or more.

6. The light modulation device according to claim 1, wherein each of the first polymer film substrate and second polymer film substrate has a ratio (CTE2/CTE1) of a coefficient of thermal expansion (CTE2) in the second direction to a coefficient of thermal expansion (CTE1) in the first direction of 1.5 or more.

7. The light modulation device according to claim 6, wherein the coefficient of thermal expansion (CTE2) in the second direction is in a range of 50 to 100 ppm/° C.

8. The light modulation device according to claim 1, wherein each of the first polymer film substrate and second polymer film substrate has a ratio (YM1/YM2) of an elastic modulus (YM1) in the first direction to an elastic modulus (YM2) in the second direction of 1.5 or more.

9. The light modulation device according to claim 8, wherein the elastic modulus (YM1) in the first direction is in a range of 2 to 10 GPa.

10. The light modulation device according to claim 1, wherein each of the first polymer film substrate and second polymer film substrate has a ratio (MS1/MS2) of a maximum stress (MS1) in the first direction to a maximum stress (MS2) in the second direction of 1.5 or more.

11. The light modulation device according to claim 10, wherein the maximum stress (MS1) in the first direction is in a range of 150 to 250 MPa.

12. An eyewear comprising a left eye lens a right eye lens, and a frame for supporting the left eye lens and the right eye lens,
wherein the left eye lens and the right eye lens each comprise the light modulation device of claim 1.

* * * * *